United States Patent
Zaneboni et al.

(10) Patent No.: US 9,789,961 B2
(45) Date of Patent: Oct. 17, 2017

(54) AIRCRAFT COMPRISING A COCKPIT DELOCALIZED OUTSIDE AN UPPER PART OF THE NOSE

(71) Applicant: AIRBUS SAS, Blagnac (FR)

(72) Inventors: Jason Zaneboni, Blagnac (FR); Bruno Saint-Jalmes, Toulouse (FR)

(73) Assignee: Airbus SAS, Blagnac (FR)

( * ) Notice: Subject to any disclaimer, the term of this patent is extended or adjusted under 35 U.S.C. 154(b) by 0 days.

(21) Appl. No.: 14/138,406

(22) Filed: Dec. 23, 2013

(65) Prior Publication Data

US 2014/0175221 A1    Jun. 26, 2014

(30) Foreign Application Priority Data

Dec. 21, 2012 (FR) ...................... 12 62645

(51) Int. Cl.

| B64D 11/06 | (2006.01) |
|---|---|
| B64D 11/00 | (2006.01) |
| B64D 41/00 | (2006.01) |
| B64D 45/00 | (2006.01) |
| B64C 1/00 | (2006.01) |
| B64C 1/18 | (2006.01) |

(52) U.S. Cl.
CPC ............... *B64D 11/00* (2013.01); *B64C 1/00* (2013.01); *B64C 1/18* (2013.01); *B64D 11/0689* (2013.01); *B64D 41/00* (2013.01); *B64D 45/00* (2013.01); *B64D 2011/0061* (2013.01); *B64D 2011/0076* (2013.01); *Y02T 50/46* (2013.01)

(58) Field of Classification Search
None
See application file for complete search history.

(56) References Cited

U.S. PATENT DOCUMENTS

| 2,240,747 | A | * | 5/1941 | Babb et al. .................... 244/1 R |
|---|---|---|---|---|
| 3,938,761 | A | * | 2/1976 | Hempenstall .................... 244/13 |
| 4,160,534 | A | * | 7/1979 | White ......................... 244/135 A |
| 4,264,044 | A | * | 4/1981 | White ......................... 244/135 A |
| 5,351,898 | A | * | 10/1994 | Koehn ......................... 244/118.5 |
| 5,499,784 | A | * | 3/1996 | Crabere et al. ............ 244/135 A |
| 5,530,650 | A | * | 6/1996 | Biferno et al. ................ 701/300 |
| 5,875,997 | A | * | 3/1999 | Al-Sabah .................... 244/118.5 |
| 7,156,344 | B1 | * | 1/2007 | Guering ...................... 244/118.5 |
| 7,309,048 | B2 | * | 12/2007 | von Thal et al. .......... 244/135 A |
| 7,546,978 | B2 | * | 6/2009 | McCoskey et al. ........ 244/118.5 |
| 2004/0169663 | A1 | | 9/2004 | Bernier |
| 2008/0179457 | A1 | | 7/2008 | Guering |
| 2008/0223984 | A1 | | 9/2008 | Guering |

FOREIGN PATENT DOCUMENTS

| DE | 101 45 261 | 4/2003 |
|---|---|---|
| EP | 1 453 009 | 9/2004 |
| FR | 2 903 661 | 1/2008 |
| FR | 2 905 929 | 3/2008 |

OTHER PUBLICATIONS

Search Report for FR 1262645, dated Aug. 2, 2013.

* cited by examiner

*Primary Examiner* — Timothy D Collins
*Assistant Examiner* — Keith L Dixon
(74) *Attorney, Agent, or Firm* — Nixon & Vanderhye P.C.

(57) ABSTRACT

An aircraft including a fuselage, a cockpit and a cabin, wherein the cockpit is situated below the cabin and outside the nose, such as a lancet-shaped nose, of the aircraft and may extend to a front end of the aircraft, and the viewing surfaces in the cockpit may be entirely formed of digital display screens.

17 Claims, 1 Drawing Sheet

AIRCRAFT COMPRISING A COCKPIT DELOCALIZED OUTSIDE AN UPPER PART OF THE NOSE

This application claims priority to FR Application No. 1262645 filed Dec. 21, 2012, the entire contents of which is hereby incorporated by reference.

BACKGROUND OF INVENTION

The invention concerns a cockpit for a civil transport aircraft, that is to say for a commercial aircraft transporting passengers, their baggage and/or goods. The cockpit is the space reserved for the pilots. It contains all the controls (controls for actuating control surfaces, lift-increasing flaps and the like, controls for actuating the landing gear, the engines, the air-brakes, etc.) and the instruments necessary for piloting the aircraft.

The architecture of aircraft has been fixed for many years, in particular as regards the position of the cockpit in aircraft. In order to give pilots good visibility of the outside scene forward of the aircraft, the cockpit is conventionally always located at the front of the fuselage, in a zone of the aircraft called the nose, provided with wide front and lateral window panes giving the pilots an unobstructed view not only forward of the aircraft, but also downward for the phases of landing and locomotion on the ground. In all that follows, "nose" is used to mean the whole of the front part of the fuselage, of modifiable form, configured to receive the crew, which extends forward generally from the rear partition of the cockpit or of a resting area for the crew in a conventional aircraft, and which comprises a radome and a housing for a front landing gear.

For aerodynamic reasons, the nose should ideally be lancet-shaped. However, the housing in the nose for radar, a landing gear and especially for the cockpit, requires a much more complex shape and structure to be provided, with numerous radii of curvature. In particular, the presence of the cockpit requires a windshield assembly to be provided having a large surface area in order to give operational physical visibility and to meet the rules and requirements for certification, such a glazed surface being very heavy which requires numerous structural reinforcements to be put in place which increase the mass of the aircraft still further, and make the nose one of the most complex parts of the aircraft to produce.

In order to optimize the view outside and in particular to limit the problems of optical distortion and the impact on the aerodynamics of the aircraft, the known windshield assemblies preferably comprise front panes which are flat or have a dual curvature with large radii, and this adds still further to the weight for the glazed part. The known windshield assemblies are complex parts to produce, which integrate poorly into the ideal aerodynamic shape of an aircraft and which weaken the nose due to discontinuities of shape and structural strength properties (the windshield assembly being a "non-working" surface) that they give rise to.

What is more, the positioning of the cockpit at the front of the aircraft extending in line with the passenger cabin reduces the size of that cabin all the more and the number of passengers capable of being received or their comfort, thereby limiting the financial profits for the airline company exploiting the aircraft.

SUMMARY OF INVENTION

The invention is directed to mitigating these drawbacks by providing an aircraft having an improved aerodynamic shape and a reduced mass.

The invention is also directed to providing an aircraft whose design and manufacture are simplified.

Another object of the invention is to enable the payload the aircraft can take aboard to be increased.

For this, the invention concerns an aircraft comprising a fuselage, a cockpit and a cabin, the cockpit being situated below the cabin, outside the nose of the aircraft.

In other words, according to the invention, the cockpit is delocalized outside the nose. This delocalization leads to the elimination of the windshield assembly provided in the earlier aircraft, and thereby the elimination of reinforcements which the presence of such a windshield assembly gives rise to. The ensuing weight and cost savings are considerable. Furthermore, the shape of the nose may henceforth evolve towards a shape that is perfect in aerodynamic terms, that is to say of lancet-shaped profile. This new shape for the nose also results in simplifying the production of the nose.

Furthermore, the volume recovered in the nose both by the delocalization of the cockpit and by the increase in volume that a pure lancet-shaped profile gives rise to may be configured to receive additional passenger seats or new functions, for example a VIP lounge capable of offering the passengers a hitherto unavailable view of the environment forward of the aircraft, via windows of small surface area whose impact on the structure of the nose is low.

Thus, in the case of a passenger transport aircraft, comprising a cabin configured to receive passengers, the cabin advantageously extends to a front end of the aircraft.

In general terms, the payload (passengers or freight) of the aircraft may be increased by a new configuration of the nose.

Conventionally, the cockpit comprises at least one of the following technical means:
flight instruments,
a system for viewing the flight instruments,
at least one seat for a pilot.

Preferably, the cockpit is accommodated in the hold, in a central part of the fuselage.

The nose fully takes advantage of this new architecture since it may henceforth be of lancet-shaped profile. Overall, the aerodynamics of the aircraft are thus improved.

In usual manner, the cockpit comprises a surface, referred to as viewing surface for piloting, giving at least one pilot a view of an outside scene comprising the environment of the aircraft forward of the aircraft.

In the aircraft according to the invention, to compensate for the loss of visibility caused by the delocalization of the cockpit, at least part of the viewing surface for piloting is formed by display means for a digital image representing at least part of an outside scene comprising the environment of the aircraft forward of the aircraft.

For example, the display means comprise one or more of the following means:
a screen and associated means for projection (including back-projection)
a device with lasers for forming a holographic image.

The loss of visibility which results from the delocalization of the cockpit is thus compensated for by the provision of a digital image including for example the lost field of vision. This digital image of the outside scene may be formed from video data supplied by an on-board video camera, disposed for example at the front of the aircraft or in a fin of the aircraft, and/or on the basis of data stored in data banks or supplied by other video cameras (for example for the phases of locomotion on the ground). It may be cleaned. It may also be enriched by the use of a technology chosen from 3D representation technologies or augmented reality technologies, etc., capable of improving the perception by the pilot of the outside scene, and thereby of increasing safety. For example, if an obstacle is detected on the path of the aircraft (in flight, this may be a storm cloud, on the ground, a vehicle situated on the runway or a parking place in an airport), it is possible to modify a video image of the outside scene so as to draw the pilot's attention to that obstacle: by putting the obstacle into relief (3D representation); by accentuating the outline of the obstacle (augmented reality); by embedding within the image the representation of the aircraft according to the invention next to the obstacle (while taking account of the current course of the aircraft), or still another possibility is by embedding within the image the plot of the path that the aircraft should take to avoid the obstacle with certainty.

Preferably, the cockpit lacks any glazed surfaces, and the entirety of the viewing surface for piloting is formed by display means, which facilitates its integration into the fin or into any location in the hold.

SUMMARY OF THE DRAWINGS

Other details and advantages of the present invention will appear from the reading of the following description, which refers to the diagrammatic appended drawings and which relates to preferred embodiments, provided by way of non-limiting examples. In the drawings.

DETAILED DESCRIPTION OF INVENTION

Figure 1:
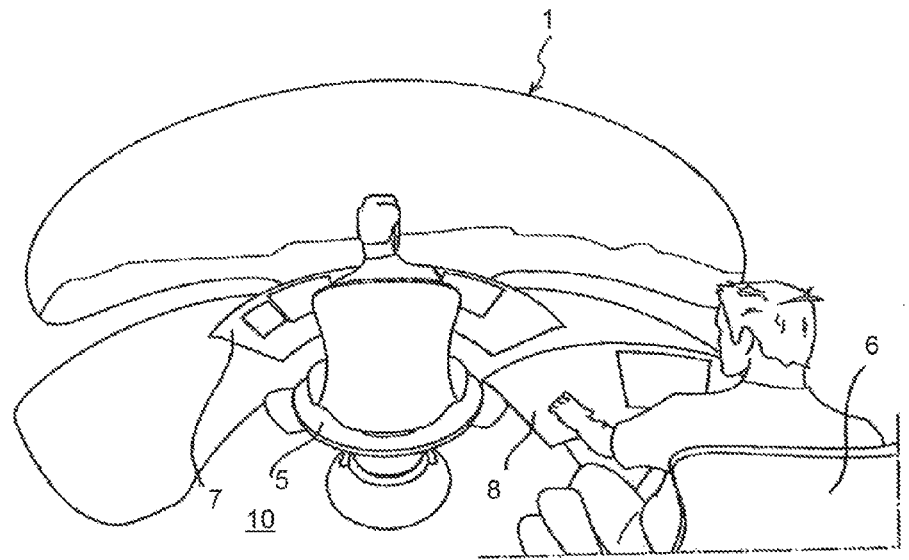
FIG. 1 is a diagrammatic perspective view of a cockpit according to the invention, which may be delocalized in a hold or in the fin.

The cockpit 10 illustrated in FIG. 1 has a viewing surface 1 for piloting which is entirely formed by a screen that is spherical (or possibly ovoid or of lancet-shaped profile), for example by an organic light-emitting diode screen (this technology enabling curved screens to be designed). This screen may form a continuous surface or be constituted by several separate sub-screens.

The cockpit further comprises a first seat 5 for a first pilot arranged substantially at the center of the spherical cap formed by the screen, and a second seat 6 for a second pilot arranged to the rear and offset to one side of the first seat 5. The expressions "to the rear", "forward", "to the side" make reference here to a direction defined by a central axis of the cockpit passing through a central point of the viewing surface for piloting 1 and through a central point of a sitting surface of the first pilot seat 5 and passing from said seat 5 to the viewing surface for piloting 1. Preferably, this central axis of the cockpit coincides with a central longitudinal axis of the aircraft, in order for the pilot to be installed in the "direction of travel" and to experience the same sensations as in a conventional cockpit. It is to be noted that the illustrated cockpit is configured to receive two pilots but that it is also possible to provide only one pilot (the cockpit then only comprises a single pilot seat).

Each seat 5, 6 is mounted on a rack slide (not shown in the drawings) preferably extending along the central axis of the cockpit, and thus enabling displacement of the seat along that axis. Forward of the rack slide of the first seat 5 are situated two rudder pedals (not visible in the drawings). The rack slide thus makes it possible to adjust the distance between the pilot seat 5 and the rudder pedals, according to the size of the pilot.

The cockpit also comprises a first instrument panel 7 which, in position of use, follows an arc of a circle substantially centered on a central point of the rack slide of the first seat 5, and a second instrument panel 8 which, in position of use, follows an arc of a circle substantially centered on a central point of the rack slide of the second seat 6.

The instrument panels 7, 8 each comprise a touch screen of transparent OLED type. Thus, the screen 2 to 4 of the viewing surface for piloting 1 is visible through the two instrument panels.

The digital image of the outside scene projected (or backprojected) onto the screen 2 to 4 is for example formed from a video image of the outside environment captured by an on-board video camera (not shown), which may be housed in the nose of the aircraft or in a fin of the aircraft. It may as a variant or in combination be reconstituted from images stored in data banks (on-board or on the ground).

The outside scene so filmed from the aircraft or reconstituted may be:
 an outside scene as is seen in a conventional aircraft, that is to say the environment of the aircraft forward of its nose;
 the environment of the aircraft and the aircraft seen from its fin (looking towards the front of the aircraft)
 the environment of the aircraft and the aircraft seen from a point situated to the rear of the aircraft and at a higher or lower altitude (this point of view being fixed relative to the aircraft, but preferably capable of being chosen by the pilot).

In a preferred version of the invention the images of several outside scenes are produced and made available to the pilot, and the display means comprise means for selecting the display enabling the pilot to select the scene or scenes he wishes to display, depending, for example, on his manner of piloting or on the situation (phase of flight, weather conditions, etc.).

Furthermore, one or more of the following elements may be added to that digital image of the outside scene:
 one or more images superposed relative to the digital image of the outside scene on the viewing surface 1 for piloting, for example such as:
  an arrow representing the path the aircraft should follow, as recommended by a pilot on the ground given various obstacles (other vehicles on the ground, clouds, etc.) present on the current path of the aircraft; this example is illustrated in FIG. 1,
  the drawing of the outline or placing in relief or in color of an obstacle in the video image in order to draw the pilot's attention to that obstacle,
  a graphical representation of one or more flight instruments, such as an artificial horizon, an anemometer, an altimeter, a directional gyroscope or horizontal situation indicator, etc.,
 an image formed holographically outside of (for example in front of) the viewing surface 1 for piloting, for example such as:
  a hologram representing a 3D mesh of the earth's surface extending under and forward of the aircraft, it being possible for part of the hologram to be superposed relative to the digital image of the outside scene on the viewing surface for piloting 1, another part being able to invade the cockpit space;
  a hologram representing a terrestrial globe with a modified flight plan which the aircraft should follow until the end of the mission, as recommended by an assistant pilot on the ground having the task of managing the flight mission (the pilot in the aircraft then only having the task of flying the aircraft, which considerably reduces his workload) given the various obstacles present on the current flight plan of the aircraft, a hologram representing for example an assistant pilot on the ground, by way of warning signal in case of some kind of danger.

a holographical representation of one or more flight instruments, such as an artificial horizon, an anemometer, an altimeter, a directional gyroscope or horizontal situation indicator, etc.

Figure 2:
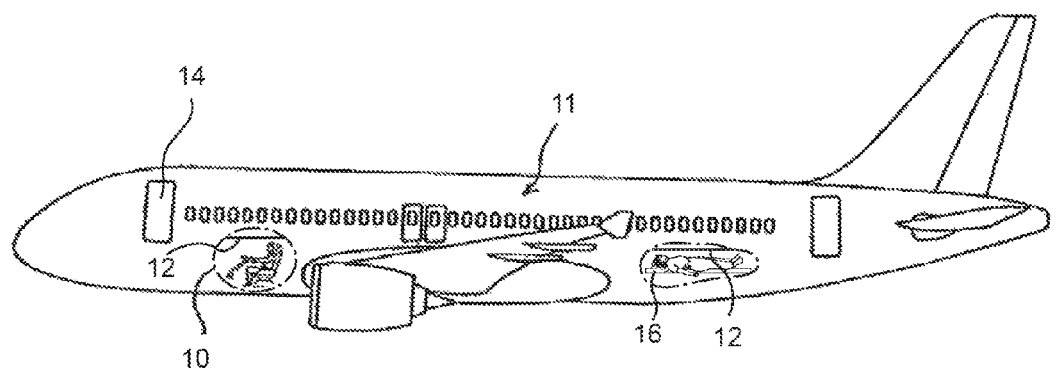
FIG. 2 is a side view of a first embodiment of an aircraft according to the invention of which part of the structure is transparent so as to see the cockpit, delocalized in a hold.

In accordance with the invention, this cockpit 10 is situated entirely outside the nose. The passenger cabin 11 then advantageously extends into the nose up to the front end of the aircraft. It is to be noted that, in this case, the cockpit 10 may be accommodated in any location of the hold in a central part of the fuselage (FIG. 2). The cockpit may be rearward of a door 14 to the passenger cabin. It is possible to provide a glazed floor 12 between the cabin and the cockpit in order to enable the passengers to observe the pilot or pilots carrying out their functions, with their agreement. A resting space 16 with berths may be configured under the floor of the cabin to the rear of the pilot seat or seats, concealed from view.

The invention may be the object of numerous variants relative to the embodiments described and illustrated, provided those variants remain within the scope delimited by the appended claims.

The invention claimed is:

1. An aircraft comprising:
   a fuselage including an outer skin and a tapered portion of the outer skin which tapers inward to a front end of the fuselage,
   a cockpit in the fuselage and including a seat for a pilot of the aircraft,
   a cabin in the fuselage configured to receive passengers and the cabin extends to the front end of the aircraft;
   a floor of the cabin which separates the cockpit from the cabin, wherein the cockpit is entirely below the cabin and rearward of the tapered outer skin of the fuselage, and
   a door in the outer skin of the fuselage and leading to the cabin, wherein the cockpit is rearward of the door.

2. The aircraft according to claim 1, wherein the cockpit is in a cargo hold region of a central portion of the fuselage.

3. The aircraft according to claim 1, wherein the floor is a glazed floor between the cabin and the cockpit.

4. The aircraft according to claim 1 wherein the aircraft further comprises a pilot resting space under the floor of the cabin and to the rear of the pilot seat in the cockpit.

5. The aircraft according to claim 1, wherein the cockpit further includes a viewing surface for piloting formed by a display device presenting a digital image of a scene of the environment outside of and forward of the aircraft, and the cockpit is devoid of a glazed surface on a fuselage window.

6. The aircraft according to claim 5, wherein the viewing surface for piloting is formed entirely by said display device.

7. An aircraft comprising:
   a fuselage having an outer skin;
   a nose region defined as a region of the fuselage in which the outer skin tapers inwardly to a forward end of the fuselage;
   a cockpit in the fuselage and rearward of the nose region of the fuselage, wherein the cockpit includes a seat for a pilot of the aircraft, a digital display device including a viewing surface configured to present a digital image of a scene of the environment outside of and forward of the aircraft, and the viewing surface faces the seat for the pilot, wherein the viewing surface is devoid of glazed surfaced windows in the fuselage providing a view to the outside of the aircraft;
   a cabin in the fuselage configured to seat passengers, wherein the cabin extends into the nose region of the fuselage;
   a cabin floor in the fuselage which separates the cockpit from the cabin, wherein the cockpit is entirely below the cabin, and
   a door in the outer skin of the fuselage and leading to the cabin, and the cockpit is rearward of the door.

8. The aircraft of claim 7 wherein the nose region is forward of the door.

9. The aircraft of claim 7 wherein the cockpit is below at least one glazed surfaced window in the cabin.

10. An aircraft comprising:
    a fuselage having an outer skin;
    a nose region of the fuselage, wherein the nose region extends from a position on the fuselage at which the outer skin tapers inward and to a front end of the fuselage;
    glazed surfaced windows in the outer skin and at the front end of the fuselage,
    a cockpit in the fuselage and reward of the nose region, wherein the cockpit includes a seat for a pilot of the aircraft, a digital display device including a viewing surface configured to present a digital image of a scene of the environment outside of and forward of the aircraft, and the viewing surface faces the seat for the pilot;
    a cabin in the fuselage and configured to seat passengers, the cabin extending into the nose region, wherein the glazed surfaced windows at the front end face the cabin and provide a forward facing view from the cabin;
    a floor of the cabin which separates the cockpit from the cabin, wherein the cockpit is entirely below the floor, and
    a door in the outer skin of the fuselage and leading to the cabin, wherein the cockpit is rearward of the door.

11. The aircraft of claim 10 wherein the floor includes a transparent region providing visibility of the seat for the pilot from the cabin.

12. The aircraft of claim 10 wherein the cockpit is below the cabin.

13. The aircraft according to claim 10, wherein the cockpit is in a cargo hold region in a central portion of the fuselage.

14. The aircraft according to claim 10, wherein the aircraft further comprises a pilot resting space under the floor of the cabin and to the rear of the pilot seat in the cockpit.

15. The aircraft according to claim 10, wherein the cockpit is devoid of a glazed surface on a fuselage window.

16. The aircraft according to claim 10, wherein the viewing surface for piloting is formed entirely by said display device.

17. The aircraft of claim 1, wherein the cockpit is rearward of the tapered outer skin of the fuselage.

* * * * *